United States Patent [19]

Kuriyama et al.

[11] Patent Number: 4,999,905
[45] Date of Patent: Mar. 19, 1991

[54] METHOD OF MAKING MAGNETIC TRANSDUCER

[75] Inventors: Katsuhiro Kuriyama, Takarazuka; Koji Funami, Kadoma; Yuji Uesugi, Osaka; Masashi Makino, Toyonaka, all of Japan

[73] Assignee: Matsushita Electric Industrial Co., Ltd., Osaka, Japan

[21] Appl. No.: 437,928

[22] Filed: Nov. 17, 1989

[30] Foreign Application Priority Data

Jun. 29, 1988 [JP] Japan ................................. 63-161611

[51] Int. Cl.$^5$ ................................................ G11B 5/42
[52] U.S. Cl. ................................... 29/603; 360/129
[58] Field of Search ................... 29/603; 360/125–127, 360/129

[56] References Cited

U.S. PATENT DOCUMENTS 3,639,976 2/1972 Hoogendoorn et al. .............. 29/603
3,922,776 12/1975 Alger et al. ............................. 29/603

Primary Examiner—Carl E. Hall
Attorney, Agent, or Firm—Wenderoth, Lind & Ponack

[57] ABSTRACT

A method of making a magnetic recording and/or reproducing head having a head support and a head core. The head core is inserted in a slit defined in the head support and is retained in position on the head support by means of a fixing jig to hold the head core immovable relative to the head support. Thereafter, a glass frit for temporarily fixing the head core relative to the head support is fused by the application of a laser beam to partially connect the head core and the head support together. After the fixing jig has been removed and a glass frit has been mounted on the head support so as to cover the slit above the head core, the assembly is loaded into a heating furnace to fuse the glass frit thereby to permanently interlock the head core and the head support together.

2 Claims, 2 Drawing Sheets

Fig. 3
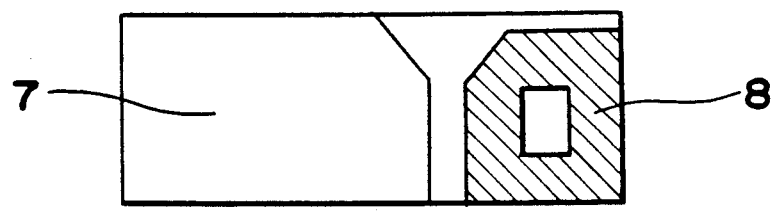
Fig. 4(a) Prior Art    Fig. 4(b) Prior Art
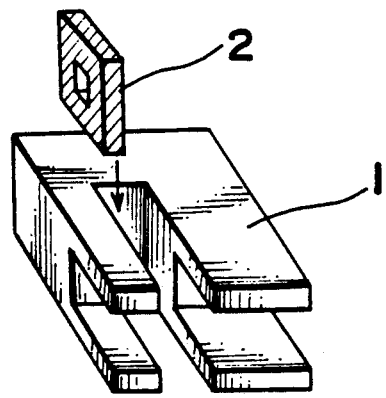
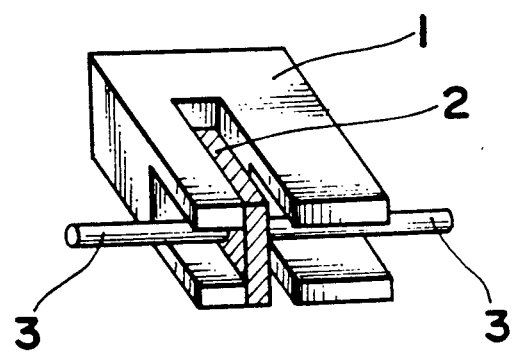
Fig. 4(c) Prior Art
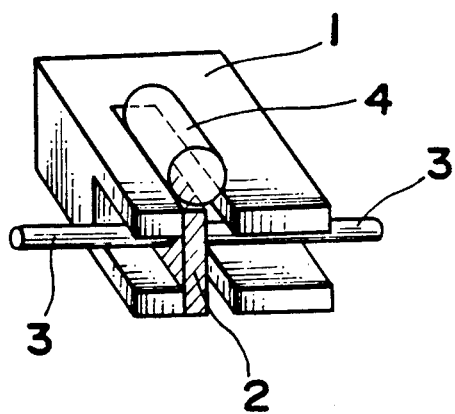
Fig. 4(d) Prior Art
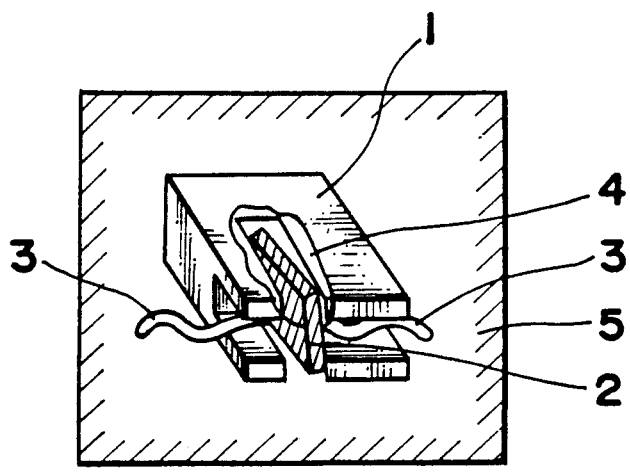

METHOD OF MAKING MAGNETIC TRANSDUCER

BACKGROUND OF THE INVENTION

1. Field of the Invention

The present invention generally relates to the art of making a magnetic recording and/or reproducing head and, more particularly, to a method of making a magnetic recording and/or reproducing head of a type that requires a magnetic head core and a head fixture or support.

2. Description of the Prior Art

The necessity of providing magnetic recording and-/or reproducing heads, hereinafter referred to as a magnetic transducer for short, has recently increased because they are one of the major component parts of a magnetic recording and/or reproducing apparatus for recording or reproducing information on or from a magnetic recording medium such as, for example, a length of magnetic recording tape or a magnetic recording disc. Numerous attempts have concomitantly been made to reduce the size of the recording gap defined in the magnetic transducer to improve the recording density. Reduction in gap size often requires an accurate and precise fabrication of the magnetic transducer.

As is well known to those skilled in the art, the magnetic transducer of a type utilized in a magnetic recording and/or reproducing apparatus, for example, a cassette tape recorder, comprises a head core and a head fixture or support on which the head core is fixedly mounted. In fixing the head core in position on the head support, various methods have hitherto been practiced in which the head core is rigidly connected with the head support by the use of a bonding agent, a metal weld or a glass frit, or a combination thereof. Of these methods, the method in which the glass frit is employed is generally considered reliable in that the head core can be rigidly secured in position to the head support.

Hereinafter, the prior art method in which the glass frit is employed for fixing the head core to the head support will be discussed with particular reference to FIG. 4 of the accompanying drawings, which consists of FIGS. 4(a) to 4(d) showing the sequence of making the magnetic transducer.

Referring to FIG. 4, reference numerals 1 and 2 designate the head support and the head core, respectively. In the practice of the method, a heat-resistant fixing jig 3 for retaining the head core 2 in position on the head support 1 and a mold glass or glass frit 4 for fixing the head core 2 to the head support 1 when fused in a heating furnace and subsequently solidified are employed. The method is practiced in the following manner.

The head core 2 is, as shown in FIG. 4(a), first inserted in a slit defined in the head support 1 made of ceramics and is subsequently retained in position in the slit by the use of the heat-resistant fixing jig 3 used to hold the head core 2 immovable relative to the head support 1 as shown in FIG. 4(b). The mold glass or glass frit 4 is then placed on the head support 1 so as to fill up the slit in the head support 1 above the head core 2 as shown in FIG. 4(c). The assembly of FIG. 4(c) including the head support 1, the head core 2, the fixing jig 8 and the glass frit 4 is heated to and retained at an elevated temperature within the heating furnace 5, as shown schematically in FIG. 4(d), to allow the glass frit 4 to be fused. Consequent upon the heating of the glass frit 4 within the heating furnace 5, the glass frit 4 in a fluidized state flows into a gap delimited within the slit between the head support 1 and the head core 2 and, accordingly, when the assembly is subsequently cooled, the glass frit 4 solidifies to connect the head core 2 rigidly to the head support 1.

It has, however been found that the prior art method discussed above has some problems. Specifically, the volume of the heat-resistant fixing jig 3 tends to become a factor of some ten to some hundred times the volume of the head support 1. Also, since the red-hot zone within the heating furnace 5 is limited to a relatively narrow range, a number of assemblies cannot be loaded into the heating furnace 5 at a time and, therefore, a number of heating furnaces are required to accomplish a mass production for a given time.

Also, where the heat-resistant fixing jig is employed, the fixing jig is susceptible to thermal expansion within the heating furnace to such an extent as to result in an undesirable deviation of the head core from the predetermined position relative to the head support.

SUMMARY OF THE INVENTION

The present invention has been devised with a view to substantially eliminating the above discussed problems inherent in the prior art method of making the magnetic transducer and has for its essential object to provide an improved method wherein no heat-resistant fixing jig is employed and which is effective to provide an improved magnetic transducer capable of exhibiting a favorable magnetic characteristic and an increased bonding strength.

In order to accomplish the above described object, the present invention provides a method of making a magnetic transducer, i.e., a magnetic recording and/or reproducing head, which comprises a step of partially connecting the head core with the head support to provide a partial joint therebetween and a step of connecting the head core and the head support together so as to cover the partial joint.

The method herein provided according to the present invention makes it possible to connect the head core and the head support together by means of a glass frit, that is, to accomplish a glass molding, within the heating furnace with no need to use any heat-resistant fixing jig such as required in the practice of the prior art method. Therefore, the space within the heating furnace which would otherwise be occupied by the heat-resistant fixing jig can be advantageously utilized as a heating space, thus making it possible to accomplish a glass molding, within the single heating furnace, of an increased number of assemblies (for example, some ten to some hundred times) at a time as compared with the prior art method.

BRIEF DESCRIPTION OF THE DRAWINGS

This and other objects and features of the present invention will become clear from the following description of a preferred embodiment thereof with reference to the accompanying drawings, in which:

FIG. 3 is a cross-sectional view, taken along the line III—III in FIG. 2; and

FIGS. 4(a) to 4(d) are schematic perspective views showing the sequence of fabrication of a magnetic transducer according to the prior art method which has been discussed above,

DETAILED DESCRIPTION OF THE EMBODIMENT

Figure 1A:
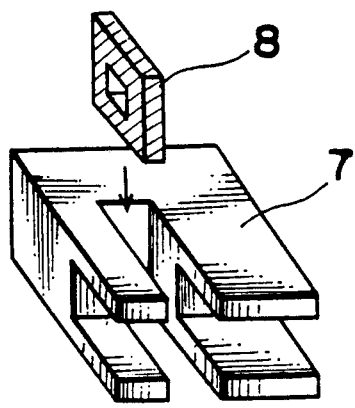
FIGS. 1(a) to 1(e) are schematic perspective views showing the sequence of fabrication of a magnetic transducer according to the present invention.

Referring to FIG. 1, reference numerals 7 and 8 designate a head support and a head core, respectively. Reference numeral 9 designates a fixing jig used to retain the head core 8 at a predetermined position on and relative to the head support 7. Reference numeral 10 designates a temporary fixing glass frit used during the execution of a first method step as will be described later; reference numeral 11 designates a laser beam used to fuse the temporary fixing glass frit 10; reference numeral 12 designates a mold glass or glass frit used during the execution of a second method step as will be described later; and reference numeral 13 designates a heating furnace.

Figure 1B:
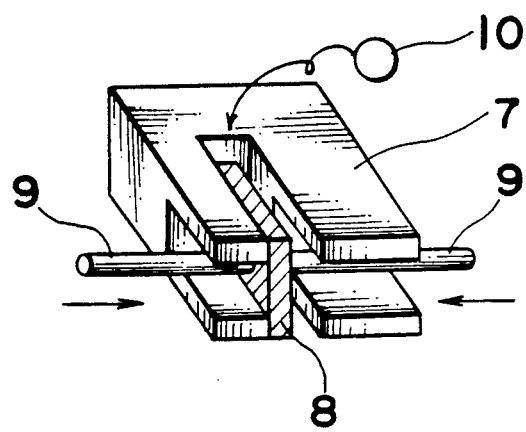
Figure 1C:
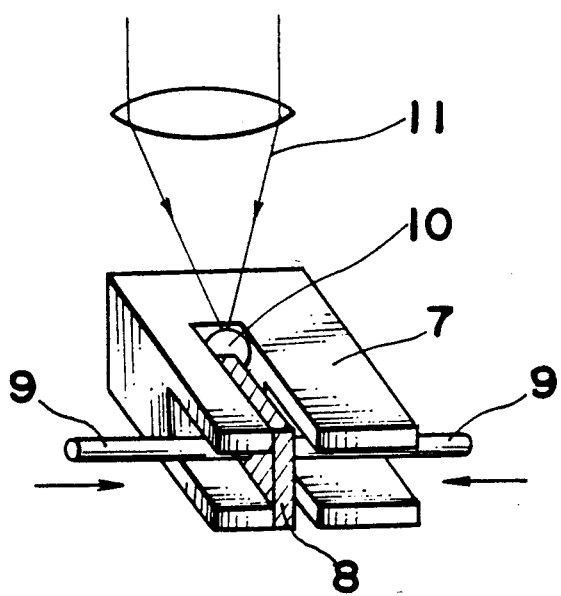
Figure 1D:
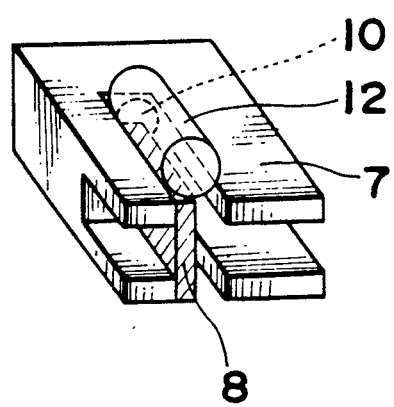
Figure 1E:
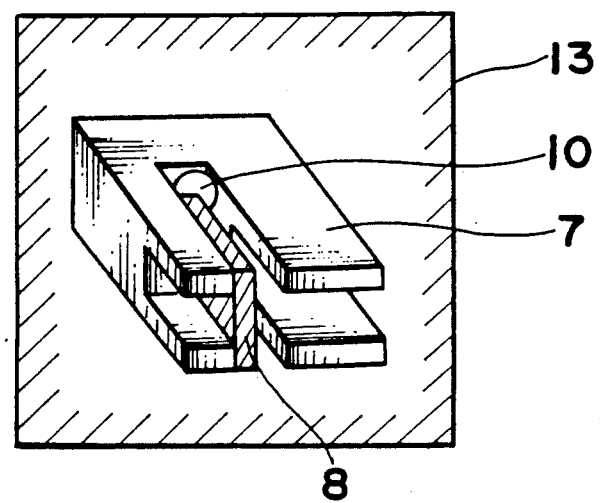

FIGS. 1(a) to 1(c) illustrate the first method step during which the head core 8 and the head support 7 are partially bonded together to define a partial joint therebetween, whereas FIGS. 1(d) and 1(e) illustrate the second method step during which a subsequent bonding is effected so as to cover the partial joint.

At the outset, the head core 8 is inserted in the head support 7 to occupy a predetermined position in the head support 7 as shown in FIG. 1(a). Then, the fixing jig 9 is used to hold the head core 8 immovable relative to the head support 7, followed by a placement of the temporary fixing glass frit 10 between the head core 8 and the head support 7 as shown in FIG. 1(b).

Thereafter, as shown in FIG. 1(c), the laser beam 11 is directed onto the temporary fixing glass frit 10 to fuse the latter so that the head core 8 and the head support 7 can be partially connected together by means of a partial joint defined by the temporary fixing glass frit 10 when the latter is solidified. Subsequently, the fixing jig 9 is removed from the assembly in which the head core 8 and the head support 7 have been partially connected together, followed by a placement of the mold glass 12 above the head core 8 so as to be seated above a slit in the head support 7 as shown in FIG. 1(d). The assembly shown in FIG. 1(d) is then loaded into and heated within the heating furnace 13 as shown in FIG. 1(e).

Consequent upon the heating of the mold glass 12 within the heating furnace 13, the mold glass 12 in a fluidized state flows into a gap delimited within the slit in the head support 7 between the head support 7 and the head core 8 and, accordingly, when the assembly is subsequently cooled, the mold glass 12 solidifies to connect the head core 8 rigidly to the head support 8.

It is to be noted that, in the practice of the method of the present invention, the temporary fixing glass frit 10 is chosen to be of a type having a softening point higher than that of the mold glass 12, so that the temporary fixing glass frit 10 once fused and then solidified will not be thermally deformed under the influence of the elevated temperature prevailing within the heating furnace 13.

It is also to be noted that, where both of the head support 7 and the head core 8 are made of ceramics and the temporary fixing glass fit 10 is fused by the application of the laser beam 11, respective portions of the head support 7 and the head core 8 where the temporary fixing glass frit 10 is to be deposited to partially connect the head support 7 and the head core 8 together are preferred to have an edge since the temporary fixing glass frit 10 tends to be hard to bond with a flat surface in any one of the ceramic head core 8 and the ceramic head support 7 and easy to bond with the edge.

Figure 2:
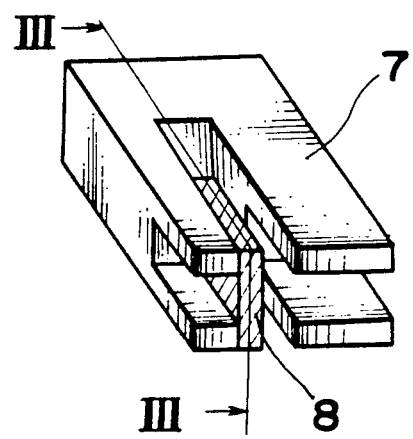
FIG. 2 is a schematic perspective view of the magnetic transducer in an assembled condition.

In the practice of the method of the present invention, the temporary fixing glass frit 10 is very small, so small as to make it difficult to hold and supply it by a mechanical feed means. Because of this, as shown in FIGS. 2 and 3, those respective portions of the head support 7 and the head core 8 adjacent the slit in the head support 7 where the laser beam 11 is directed to fuse the temporary fixing glass frit 10 are inclined so as to diverge outwardly of the assembly thereby to define an acute angled groove between the thus inclined portions of the head support 7 and the head core 8. By the definition of the acute angled groove between the head support 7 and the head core 8 as hereinabove described, the temporary fixing glass frit 10 when dropped from above can be supplied to a predetermined position under the influence of a gravitational force. In addition, the provision of the inclined portions produces an angled edge where the respective inclined portions join the adjacent support or core surface, which brings about an additional advantage in that the temporary fixing glass frit 10 can exhibit a favorable bondability relative to the head support 7 or the head core 8.

As hereinbefore fully described, the method of the present invention comprises a step of partially connecting the head core with the head support to provide a partial joint therebetween and a step of connecting the head core and the head support together so as to cover the partial joint. Accordingly, during the heating of the assembly within the heating furnace for glass molding, the head core will not move arbitrarily relative to the head support and, therefore, it is possible to accomplish the glass molding, within the single heating furnace, of an increased number of assemblies (for example, some ten to some hundred times as compared with the prior art method) at a time.

Moreover, since the angled edge is defined between those respective portions of the head support and the head core where the laser beam is directed to fuse the temporary fixing glass frit, the supply or placement of the minute temporary fixing glass frit can be facilitated while causing the subsequently fused temporary fixing glass frit to exhibit a favorable bondability relative to the head support or the head core.

Although the present invention has been fully described in connection with the preferred embodiment thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A method of making a magnetic recording and reproducing head, comprising the steps of:
    inserting into a cavity defined in a head support a head core for accommodating the head core in said cavity, and holding the head core both in a predetermined position and immovable relative to the head support by a holding means;
    placing a first glass frit within the cavity in the head support so as to contact the head core and the head support simultaneously at a specified location relative to the head core;

melting the first glass frit and then allowing the melted first glass frit to solidify for forming a partial connection between the head core and the head support;

removing the holding means;

with the head core held on the head support at said predetermined position only by the partial connection, placing a second glass frit on the head core and head support in a position for contacting the head core and head support simultaneously at a region other than the region of the partial connection said second glass frit having a melting point lower than that of said first glass frit; and heating the thus assembled head core, head support and second glass frit for melting only the second glass frit, and thereafter discontinuing the heating for allowing the second glass frit to solidify for firmly connecting the head core and head support together.

2. A method of making a magnetic recording and/or reproducing head, comprising the steps of:

inserting into a cavity defined in a generally U-shaped head support a generally plate-like head core for accommodating the head core in the cavity, and holding the head core both in a predetermined position and immovable relative to the head support by the use of a fixing jig;

placing a first glass frit within the cavity in the head support so as to contact the head core and the head support simultaneously at a specified location relative to the head core;

radiating a laser beam onto the first glass frit for melting the first glass frit and then discontinuing the radiating for permitting solidification of the first glass frit for partially connecting the head core and the head support together by the first glass frit;

removing the fixing jig;

with the head core held on the head support at said predetermined position only by the partial connection, placing a second glass frit on the thus connected head core and head support in a position for contacting the head core and head support simultaneously at a region other than the region where the head core and the head support are connected together by the first glass frit the second glass frit having a melting point lower than that of the first glass frit; and heating the assembly of the head core, the head support and the second glass frit in a heating furnace for melting only the second glass frit, and thereafter discontinuing the heating for causing the head core and head support to be firmly connected together by the solidification of the second glass frit.

* * * * *